United States Patent
Winkler et al.

(10) Patent No.: US 10,690,395 B2
(45) Date of Patent: Jun. 23, 2020

(54) VACUUM INSULATION BODY

(71) Applicants: LIEBHERR-HAUSGERATE LIENZ GMBH, Lienz (AT); LIEBHERR-HAUSGERATE OCHSENHAUSEN GMBH, Ochsenhausen (DE)

(72) Inventors: Andreas Winkler, Irschen (AT); Jochen Hiemeyer, Karlstadt (DE)

(73) Assignees: LIEBHERR-HAUSGERATE LIENZ GMBH, Lienz (AT); LIEBHERR-HAUSGERATE OCHSENHAUSEN GMBH, Ochsenhausen (DE)

( * ) Notice: Subject to any disclaimer, the term of this patent is extended or adjusted under 35 U.S.C. 154(b) by 0 days.

(21) Appl. No.: 16/324,128

(22) PCT Filed: Sep. 12, 2017

(86) PCT No.: PCT/EP2017/001078
§ 371 (c)(1),
(2) Date: Feb. 8, 2019

(87) PCT Pub. No.: WO2018/050279
PCT Pub. Date: Mar. 22, 2018

(65) Prior Publication Data
US 2019/0170430 A1    Jun. 6, 2019

(30) Foreign Application Priority Data

Sep. 13, 2016 (DE) .................. 10 2016 011 085
Aug. 4, 2017 (DE) .................. 10 2017 117 733

(51) Int. Cl.
*F16L 59/065*    (2006.01)
*F25D 23/06*    (2006.01)
(Continued)

(52) U.S. Cl.
CPC .......... *F25D 23/062* (2013.01); *F16L 59/065* (2013.01); *B65D 81/38* (2013.01);
(Continued)

(58) Field of Classification Search
CPC .. Y10T 428/231; F16L 59/065; F25D 23/062; F25D 2201/14; E04B 1/803; B65D 81/38; Y02B 80/12
See application file for complete search history.

(56) References Cited

U.S. PATENT DOCUMENTS 1,984,007 A    12/1934 Babbitt
2003/0203149 A1    10/2003 Allen et al.
(Continued)

FOREIGN PATENT DOCUMENTS

DE    3319146 A1    11/1984
DE    8913435 U1    3/1990
(Continued)

OTHER PUBLICATIONS

Search Report issued in corresponding German Patent Application No. 10 2017 117 733.7 dated Aug. 22, 2017 (9 pages).
(Continued)

*Primary Examiner* — Alexander S Thomas
(74) *Attorney, Agent, or Firm* — Kilyk & Bowersox, P.L.L.C.

(57) ABSTRACT

A vacuum insulation body comprising at least one vacuum-tight covering that surrounds at least one evacuated region, wherein one or more core materials are arranged in the evacuated region, and wherein the vacuum-tight covering has at least one evacuation opening that is provided with at least one valve having at least one valve disk that opens the evacuation opening in the opened state and that releases the evacuation opening in the closed state, with means for a (Continued)

Figure 1:
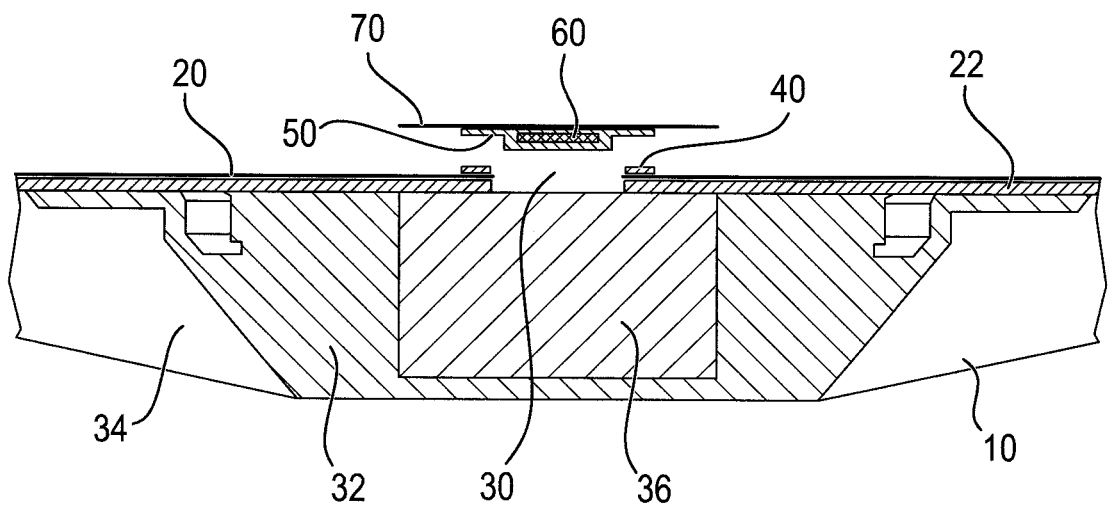

vacuum-tight sealing of the evacuation opening being arranged outside the sealing region of the valve disk.

20 Claims, 2 Drawing Sheets

(51) Int. Cl.
*E04B 1/80* (2006.01)
*B65D 81/38* (2006.01)

(52) U.S. Cl.
CPC .......... *E04B 1/803* (2013.01); *F25D 2201/14* (2013.01); *Y02B 80/12* (2013.01); *Y10T 428/231* (2015.01)

(56) References Cited

U.S. PATENT DOCUMENTS

| 2005/0173668 A1 | 8/2005 | Van Zijll Langhout et al. |
| 2006/0118168 A1 | 6/2006 | Cheung |
| 2009/0031659 A1 | 2/2009 | Kalfon |
| 2015/0044412 A1 | 2/2015 | Miyaji et al. |
| 2017/0321956 A1 | 11/2017 | Hiemeyer et al. |
| 2017/0327297 A1 | 11/2017 | Hiemeyer et al. |

FOREIGN PATENT DOCUMENTS

| DE | 4320544 A1 | 12/1994 |
| DE | 19602940 A1 | 7/1997 |
| DE | 60105036 T2 | 12/2004 |
| DE | 202004005887 U1 | 9/2005 |
| DE | 102015008123 A1 | 5/2016 |
| DE | 102015008128 A1 | 5/2016 |
| DE | 102015008160 A1 | 5/2016 |
| DE | 102015008157 A1 | 6/2016 |
| DE | 102015008130 A1 | 7/2016 |
| DE | 102015008159 A1 | 7/2016 |
| DE | 102015008162 A1 | 7/2016 |
| GB | 1345609 A | 1/1974 |
| JP | H04210197 A | 7/1992 |

OTHER PUBLICATIONS

International Search Report and Written Opinion issued in corresponding International Patent Application No. PCT/EP2017/001078 (with English translation of International Search Report) dated Nov. 23, 2017 (19 pages).

VACUUM INSULATION BODY

This application is a National Stage Application of PCT/EP2017/001078, filed Sep. 12, 2017, which claims priority to German Patent Application No. 10 2017 117 733.7, filed Aug. 4, 2017 and German Patent Application No. 10 2016 011 085.6, filed Sep. 13, 2016.

The present invention relates to a vacuum insulation body comprising at least one vacuum-tight covering that surrounds at least one evacuated region, wherein one or more core materials such as perlite are arranged in the evacuated region.

There is generally the option of evacuating such vacuum insulation bodies inside or also outside a vacuum chamber, with the closure of the evacuation opening of the vacuum insulation body being of particular importance on an evacuation outside a vacuum chamber. On the one hand, the evacuation opening of the vacuum insulation body has to have a sufficiently large cross-section during the evacuation process for an expeditious venting or evacuation; on the other hand, this opening has to be closed again reliably and in a gas-tight manner after evacuation has taken place. To achieve a typical service life of the vacuum insulation body, the gas introduction rate into the complete vacuum insulation bodies, i.e. the vacuum insulation bodies being used, should be in the range from $10^{-8}$ bis $10^{-7}$ mbar*l/s.

The vacuum-tight covering is preferably partially or completely formed by one or more high barrier films.

It is known from the prior art with film-covered vacuum insulation bodies having an evacuation nozzle, to place a film tube at the vacuum-tight covering or at the evacuation nozzle, with an evacuation pipe that keeps the required evacuation cross-section open being led through said film tube during the evacuation process. Once the evacuation process has been completed, the evacuation pipe is removed from the film tube and the latter is then thermally sealed.

It is furthermore known from the field of metal-covered vacuum insulation plates to carry out an evacuation by a suction cup placed over the evacuation opening and to close the evacuation opening once the evacuation process has taken place by an apparatus attached in the vacuum space or by a welding process.

It is the underlying object of the present invention to further develop a vacuum insulation body of the initially named kind such that it can be evacuated in a comparatively simple manner.

This object is achieved by a vacuum insulation body having the features of claim 1.

Provision is accordingly made that the vacuum-tight covering has at least one evacuation opening that is provided with at least one valve having a valve disk that opens the evacuation opening in the opened state and that releases the evacuation opening in the closed state, with means for a vacuum-tight sealing of the evacuation opening being arranged outside the sealing region of the valve disk.

It is possible by such a vacuum insulation body that the evacuation nozzle of the vacuum insulation body is at least closed in a gas-tight manner for the time of the transfer between different evacuation stations or for the time between two evacuation processes such that no substantial quantities of gas penetrate into the interior of the vacuum insulation body and thus significantly increase its thermal conductivity. This closure has to be able to be opened to the full cross-section again where possible for the later or for a further evacuation step. The valve disk of the vacuum insulation body serves this purpose that is movable to and fro between a closed position and an open position and is opened for a repeat evacuation process.

If the valve disk is in the closed position, the partially evacuated vacuum insulation body can be taken to a new evacuation station without there being any risk of substantial quantities of gas penetrating into the vacuum insulation body.

It is pointed out at this point that the term "valve disk" comprises any desired element that is suitable to close a valve opening or the evacuation nozzle. The valve disk here can be of plate shape, but any other shape is also covered by the invention.

Typical seal tightness demands in accordance with the present invention on these intermediary (i.e. not final) closure by the valve disk are in the range of a gas introduction rate into the vacuum insulation body in the range from $10^{-5}$ bis $10^{-3}$ mbar*l/s.

Once the evacuation of the vacuum insulation body is terminated, the vacuum-tight sealing (=final sealing) around the sealing region of the valve disk takes place so that it is ensured that only very small gas introduction rates are still present or that only very little gas enters into the vacuum insulation body through the evacuation opening per unit of time. The vacuum-tight sealing can, for example, take place by the cooperation of a plurality of plastic layers that are, for example, sealed together by an action of heat.

Polyolefins and in particular polyethylene can, for example, be considered as plastics.

As already stated above, the valve disk also has to provide a certain sealing effect in the closed state of the valve. Provision is therefore preferably made that the valve disk cooperates in the closed state of the valve with at least one valve seat whose sealing material has a Shore hardness of ≤80 Shore, preferably ≤40 Shore. The sealing material can alternatively or additionally also be arranged at the valve disk.

Provision is made in a further embodiment of the invention that the valve disk comprises at least one magnetic, in particular ferromagnetic, material that is arranged such that it can cooperate with at least one external magnet (i.e. a magnet not belonging to the vacuum insulation body), in particular an electromagnet. It is thus possible to move the valve disk by the application of a magnetic force. It is in particular of advantage here if the magnet or electromagnet is a component of a suction cup or of another suction apparatus that is sealingly placed onto the vacuum insulation body around the evacuation opening.

Provision is made in a further embodiment of the invention that the valve disk and/or the valve seat with which the valve disk cooperates has at least one centering aid so that it is ensured that the valve disk is correctly arranged in the valve seat. The valve disk and/or the valve seat can be provided with one or more, preferably peripheral, sealing materials to have the effect that a sufficient gas-tightness is present with a closed valve disk.

The valve disk and/or the valve seat can be elastic in full or in part. This brings along the advantage that any irregular shape of the valve disk or of the valve seat does not result in a leak, but is rather compensated by the elastic deformation of the respective other part. As already stated above, it is of advantage if the valve disk and/or the valve seat has/have at least one seal, in particular a flat seal, that seals the valve temporarily, i.e. between two evacuation processes.

Provision is made in a further embodiment of the invention that the valve seals in the closed state without any vacuum-tight seal, i.e. prior to the final sealing, such that the gas introduction rate through the valve is in the range from $10^{-5}$ bis 10 mbar*l/s.

Provision can furthermore be made that the means for the vacuum-tight sealing are formed in part or in full by one or more gas-tight films, in particular high barrier films. It is conceivable here that one of the films is a component of the valve of the vacuum insulation body and one of the films forms a region of the outer covering of the vacuum insulation body. Once a sufficient vacuum level has been reached within the vacuum insulation body, the vacuum-tight sealing, i.e. the final sealing, around the evacuation opening takes place so that a further gas introduction through the evacuation opening is prevented or reduced.

Provision is made in a further embodiment of the invention that the vacuum insulation body has at least one stable area element, in particular a piece of sheet metal, that forms the valve seat of the valve disk or a part region thereof, on the one hand, and that serves as a support for the step of the vacuum-tight sealing, on the other hand. This piece of sheet metal can thus be a part of the vacuum insulation body that is covered at its outer side by a film, in particular by a vacuum-tight film, such as by a high barrier film. The area element can be configured such that the valve terminates flush with the sections surrounding the valve when the valve disk is in the closed position so that a planar surface is achieved overall.

The present invention further relates to an arrangement that comprises at least one vacuum insulation body in accordance with one of the claims 1 to 10 and at least one suction cup that is placed onto the evacuation opening of the vacuum insulation body, with the suction cup lying in a sealing manner on the vacuum insulation body in the region around the evacuation opening, and with the suction cup having at least one region with a vacuum in which at least one lifting element for opening the valve is arranged. The interior of the vacuum insulation body can thus be evacuated, with the lifting element or another element optionally being suitable also to close the valve again after the evacuation process has taken place, and with provision preferably being made that the lifting element is designed as an electromagnet.

In this embodiment of the invention, the suction cup thus not only serves the evacuation of the vacuum insulation body, but rather simultaneously has an influence on the state of the valve disk. The suction cup has one or more lifting elements such as electromagnets that raise the valve disk in operation or in dependence on the operating state and thus open the evacuation opening so that the evacuation of the vacuum insulation body is possible. Subsequently a closing of the valve can take place by the moving of the valve disk back onto the valve seat, likewise by the electromagnet or simply by switching off the electromagnet. This movement can be caused or assisted by the vacuum already present in the vacuum insulation body.

The present invention further relates to a method of evacuating one or more vacuum insulation bodies in accordance with one of the claims 1 to 10. The method is characterized in that at least one suction cup is placed onto the vacuum insulation body for the purpose of evacuating the vacuum insulation body, the suction cup sealing the region around the valve disk and having at least one lifting element, and with the valve disk being raised for the purpose of evacuation and with the suction opening thus being opened, and with the valve disk again being lowered onto the evacuation opening after the evacuation. This lowering can be caused, for example, by the vacuum present in the vacuum insulation body or also by the electromagnet or another lifting element.

As already stated above, it can be possible that the lifting element is formed by an electromagnet.

Provision is made in a further embodiment of the invention that the evacuation process of the vacuum insulation body preferably runs sequentially at one or more suction cups and that the evacuation opening of the vacuum insulation body is closed by the valve disk on the transfer of the vacuum insulation body between the evacuation stations or also between two evacuation processes, optionally at the same suction cup.

The plurality of evacuation processes that follow one another in time can generally be carried out at different suction cups or also at the same suction cup. It is important in both cases that a gas-tight sealing of the evacuation nozzle, i.e. of the evacuation opening, takes place by the valve disk between two evacuation processes.

As already stated, it is of advantage that the vacuum-tight sealing takes place after the last evacuation process, with the vacuum-tight sealing preferably taking place in a vacuum. The vacuum-tight sealing named within the framework of the present invention can also be called a vacuum-tight final sealing since it preferably represents the last step of the evacuation process.

The present invention can always advantageously be used when a vacuum insulation body is not evacuated in one step, but when a plurality of evacuation steps are rather required to reach the desired final vacuum.

We refer by way of example to the procedures that are described in the German patent applications 10 2015 008 162.4, 10 2015 008 130.6, and 10 2015 008 159.4 and that are herewith made the subject matter of the present invention.

The present invention furthermore relates to a thermally insulated container, preferably to a refrigerator unit and/or freezer unit having at least one temperature-controlled, and preferably cooled, inner space and having at least one wall, preferably an outer wall, at least regionally surrounding the temperature-controlled, and preferably cooled, inner space, wherein at least one vacuum insulation body in accordance with one of the claims 1 to 10 is located between the temperature-controlled, and preferably cooled, inner space and the wall.

Provision is preferably made that no further thermal insulation is present except for the vacuum insulation body or bodies and that it is thus a full vacuum unit or full vacuum container.

Embodiments are also covered by the invention, however, in which at least one further insulting material is present in addition to said vacuum insulation body.

The temperature-controlled inner space is either cooled or heated depending on the type of the unit (refrigerator unit, heating cabinet, etc.) Heat insulated containers in the sense of the present invention have at least one temperature-controlled inner space, with this being able to be cooled or heated so that a temperature results in the inner space below or above the environmental temperature of e.g. 21° C. The invention is therefore not restricted to refrigerator units and/or freezer units, but rather generally applies to units having a temperature-controlled inner space, for example also to heat cabinets or heat chests.

With respect to this container in accordance with the invention, the vacuum insulation body in accordance with the invention preferably represents a full vacuum system that is arranged in the space between the inner wall bounding the inner space of the container or unit and the outer skin of the container or unit. A thermal insulation is to be understood by a full vacuum system which comprises only or primarily an evacuated region which is filled with a core material. The bounding of this region can be formed, for example, by a vacuum-tight film and preferably by a high barrier film. Only such a film body can thus be present between the inner wall of the container, preferably the unit, and the outer skin of the container, preferably of the unit, as the thermal insulation which has a region which is surrounded by a vacuum-tight film, in which there is a vacuum and in which a core material is arranged. A foaming and/or a vacuum insulation panel is/are preferably not provided as heat insulation or another heat insulation is not provided, except for the full vacuum system between the inner side and the outer side of the container or of the unit.

This preferred form of thermal insulation in the form of a full vacuum system can extend between the wall bounding the inner space and the outer skin of the carcass and/or between the inner side and the outer side of the closing element such as a door, flap, lid, or the like. The same applies accordingly to an embodiment in which further thermal insulation materials are present in addition to the vacuum insulation body or bodies.

The full vacuum system can be obtained such that a covering of a gas-tight film is filled with a core material and is subsequently sealed in a vacuum-tight manner. In an embodiment, both the filling and the vacuum-tight sealing of the covering take place at normal or environmental pressure. The evacuation then takes place by connecting a suitable interface that is worked into the covering, that is in the form of an evacuation nozzle, and that has a valve to which a suction cup or vacuum pump is connected. Normal or environmental pressure is preferably present outside the covering during the evacuation. In this embodiment, it is preferably not necessary at any time of the manufacture to introduce the covering into a vacuum chamber. A vacuum chamber can be dispensed with in an embodiment to this extent during the manufacture of the vacuum insulation.

Provision is made in an embodiment that the container in accordance with the invention is a refrigerator unit and/or a freezer unit, in particular a domestic appliance or a commercial refrigerator. Such units are, for example, covered which are designed for a stationary arrangement at a home, in a hotel room, in a commercial kitchen or in a bar. It can, for example, also be a wine cooler. Chest refrigerators and/or freezers are furthermore also covered by the invention. The units in accordance with the invention can have an interface for connection to a power supply, in particular to a domestic mains supply (e.g. a plug) and/or can have a standing aid or installation aid such as adjustment feet or an interface for fixing within a furniture niche. The unit can, for example, be a built-in unit or also a stand-alone unit.

The container or the unit is preferably configured such that it can be operated at an AC voltage such as a domestic mains voltage of e.g. 120 V and 60 Hz or of 230 V and 50 Hz. It is conceivable in an alternative embodiment that the container or the unit is configured such that it can be operated with DC current of a voltage of, for example, 5 V, 12 V or 24 V. Provision can be made in this embodiment that a plug power supply is provided inside or outside the unit via which the unit is operated. Operation with DC voltage can in particular be used when the container has a thermoelectric heat pump for controlling the temperature of the inner space.

Provision can in particular be made that the refrigerator unit and/or freezer unit has/have a cabinet-type design and has/have a useful space which is accessible to a user at its front side (at the upper side in the case of a chest). The useful space can be divided into a plurality of compartments which are all operated at the same temperature or at different temperatures. Alternatively, only one compartment can be provided. Storage aids such as trays, drawers or bottleholders (also dividers in the case of a chest) can also be provided within the useful space or within a compartment to ensure an ideal storage of refrigerated goods or frozen goods and an ideal use of the space.

The useful space can be closed by at least one door pivotable about a vertical axis. In the case of a chest, a lid pivotable about a horizontal axis or a sliding lid is conceivable as the closing element. The door or another closing element can be connected in a substantially airtight manner to the carcass by a peripheral magnetic seal in the closed state. The door or another closing element is preferably also thermally insulated, with the thermal insulation being able to be achieved by a foaming and optionally by vacuum insulation panels or also preferably by a vacuum system and particularly preferably by a full vacuum system. Door storage areas can optionally be provided at the inside of the door in order also to be able to store refrigerated goods there.

It can be a small appliance in an embodiment. In such units, the useful space defined by the inner wall of the container has, for example, a volume of less than 0.5 m$^3$, less than 0.4 m$^3$ or less than 0.3 m$^3$. The outer dimensions of the container or unit are preferably in the range up to 1 m with respect to the height, width and depth.

A vacuum-tight or diffusion-tight covering or a vacuum-tight or diffusion-tight connection or the term high barrier film is preferably understood as a covering or as a connection or as a film by means of which the gas introduction into the vacuum insulation body is reduced so much that the increase in the thermal conductivity of the vacuum insulation body caused by gas introduction is sufficiently low over its service life. A time period of 15 years, preferably of 20 years, and particularly preferably of 30 years, is to be considered as the service life, for example. The increase in the thermal conductivity of the vacuum insulation body caused by gas introduction is preferably <100%, and particularly preferably <50%, over its service life.

The surface-specific gas flow rate of the covering or of the connection or of the high barrier film is preferably <$10^{-5}$ mbar*l/s*m$^2$ and particularly preferably <$10^{-6}$ mbar*l/s*m$^2$ (measured according to ASTM D-3985). This gas flow rate applies to nitrogen and to oxygen. There are likewise low gas flow rates for other types of gas (in particular steam), preferably in the range from <$10^{-2}$ mbar*l/s m$^2$ and particularly preferably in the range from <$10^{-3}$ mbar*l/s*m$^2$ (measured according to ASTM F-1249-90). The aforesaid small increases in the thermal conductivity are preferably achieved by these small gas flow rates.

A covering system known from the sector of vacuum panels are so-called high barrier films. Single-layer or multilayer films (which are preferably able to be sealed) having one or more barrier layers (typically metal layers or oxide layers, with aluminum and an aluminum oxide preferably being used as the metal or oxide respectively) are preferably understood by this within the framework of the present invention which satisfy the above-named demands (increase in thermal conductivity and/or surface-specific gas flow rate) as a barrier to the gas introduction.

The above-named values or the make-up of the high barrier film are exemplary, preferred values which do not restrict the invention.

Figure 2:
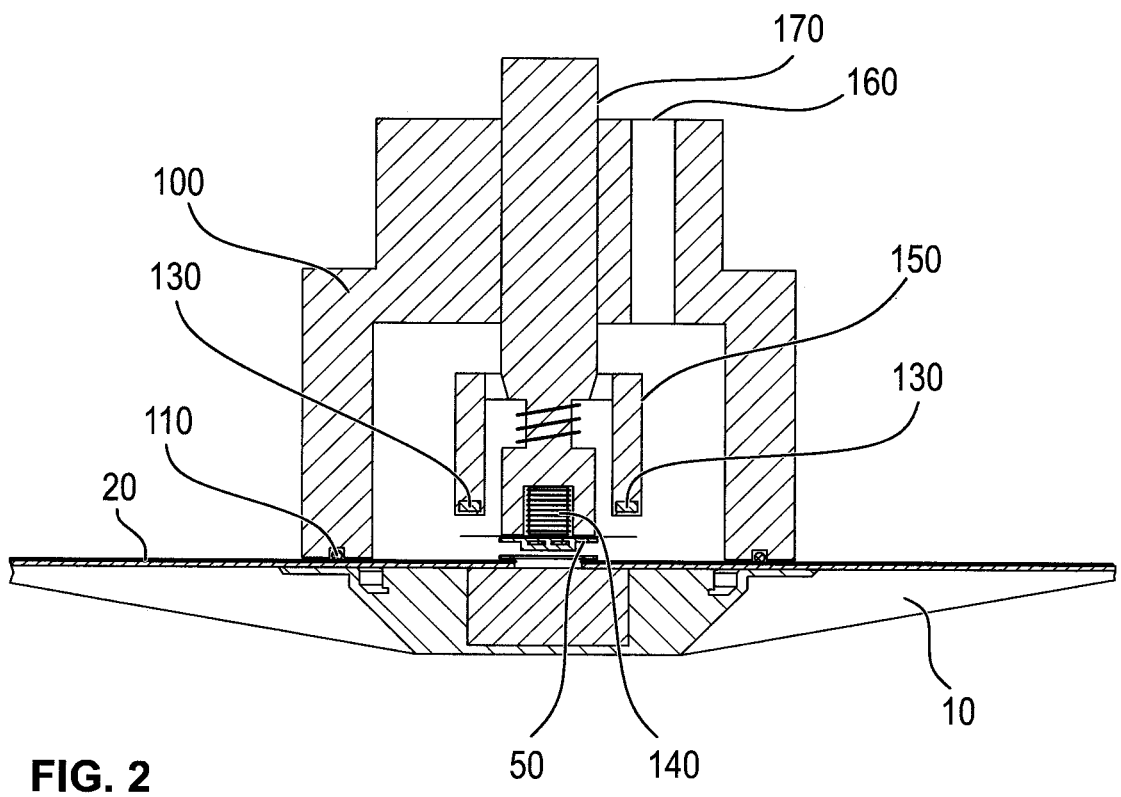
Figure 3:
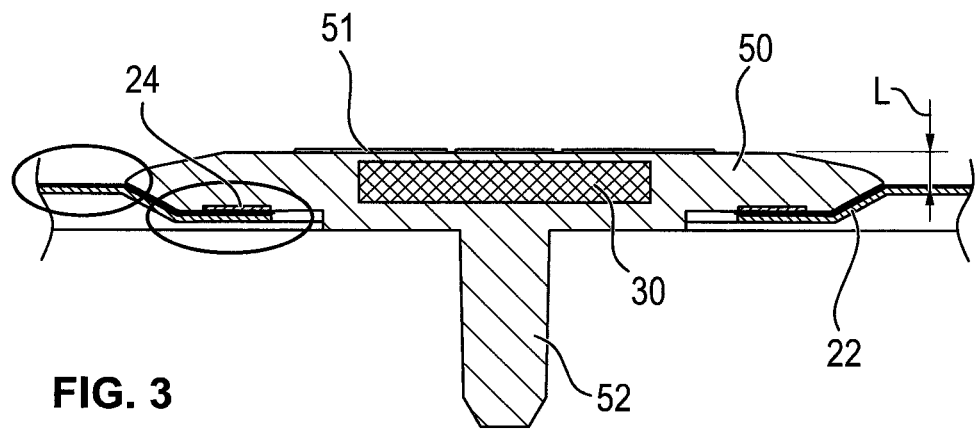
Figure 4:
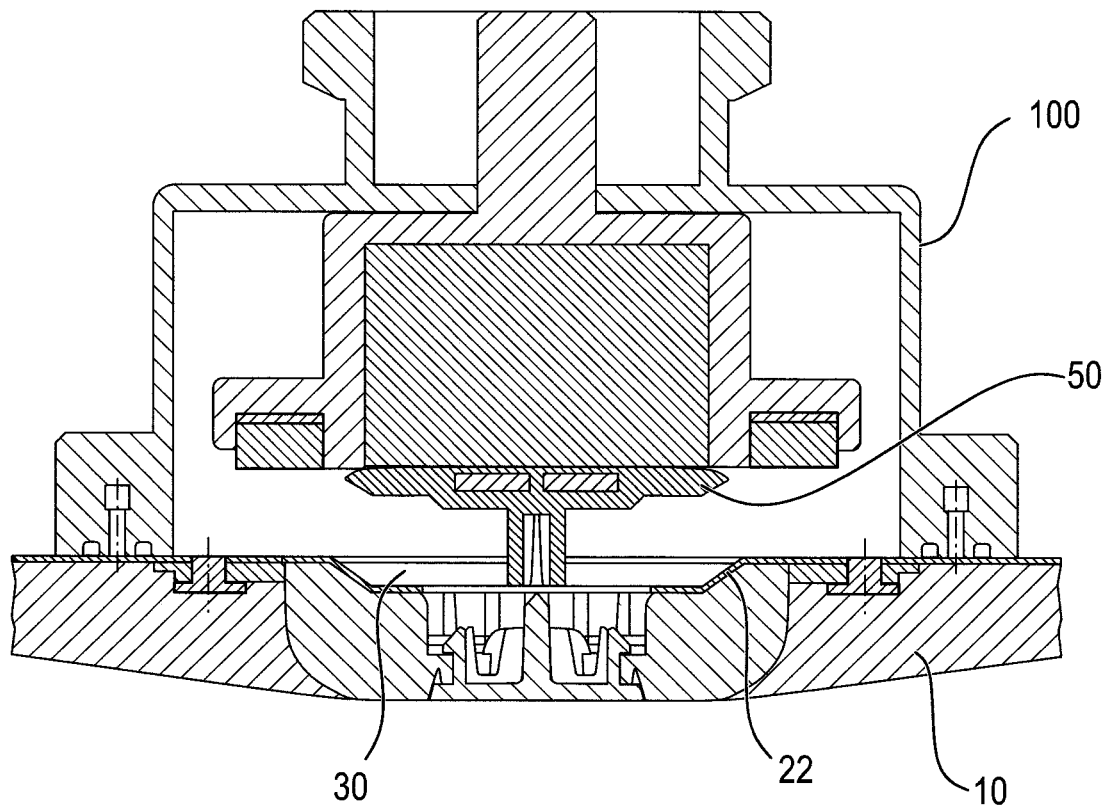

Further details and advantages of the invention will be explained in more detail with reference to an embodiment shown in the drawing. There are shown:

FIG. 1: a sectional view through a vacuum insulation body in accordance with the invention in the region of the evacuation opening;

FIG. 2: a sectional view in accordance with FIG. 1 with a suction cup placed on;

FIG. 3: a sectional view through the evacuation opening with an inserted valve disk; and FIG. 4: a sectional view through the vacuum insulation body in the region of the evacuation opening with a suction cup placed on.

FIG. 1 shows a vacuum insulation body in accordance with the present invention with the reference symbol 10.

The vacuum insulation body 10 comprises a core material such as perlite that serves as a support material for the evacuated state. This core material is surrounded by a vacuum-tight covering, preferably by a high barrier film 20, that prevents gas from entering into the vacuum insulation body to an unpermittedly high degree. The reference symbol can form a double-side film patch.

Reference numeral 30 marks an opening in the film material of the vacuum insulation body, i.e. the evacuation opening. The so-called sorption pump, i.e. an arrangement of a primary flow distributor 32 and a gas-absorbing material such as zeolite 34, is located below the evacuation opening within the vacuum insulation body.

The flow distributor has the task of configuring the flow within the vacuum insulation body during the evacuation process such that as many regions as possible can be uniformly evacuated or to convey the flow toward the evacuation opening. The zeolite 34 has the task of adsorbing molecules such as water.

The film material 20 is a double-sided film patch of this sorption pump 36 and can, as stated, be designed as a high barrier film. It can be the same, film material as the actual vacuum-tight covering of the vacuum insulation body or also a different film.

Reference numeral 22 marks a sheet metal part of the sorption pump that is located, as can be seen from FIG. 1, below, i.e. directed toward the inside, in the vacuum insulation body. A flat seal that provides the sealing with a closed valve disk is marked by reference numeral 40. The valve disk is marked by reference numeral 50 and its iron core by reference numeral 60. A film patch 70 that is sealed by the film patch 20 of the sorption pump 36 for the purpose of the final sealing is located at the upper side of the valve disk 50.

The valve disk 50 is movable to and fro between two different positions. In the position shown in accordance with FIG. 1, it opens the evacuation opening so that an evacuation process can be carried out.

The state of the evacuation results from FIG. 2. In this state, the suction pump 100 is placed onto the film 20 or outwardly on the vacuum insulation body.

It is achieved via seals or via at least one peripheral seal 110 (e.g. an O ring seal) that the suction cup seals the region around the evacuation opening 30.

Heated (optionally permanently heated) means for the final sealing with integrated compensation material are marked by reference numeral 130 and are required when the evacuation process is ended. Reference numeral 140 marks an electromagnet of the suction cup 100 that is actuated to open and close the valve disk 50. In the state shown here, the valve disk 50 is in the open state.

Reference numeral 150 generally marks the opener to open the valve disk. Reference numeral 160 marks the vacuum connector and the vacuum leadthrough with integrated lines is marked by 170.

FIG. 3 shows the valve disk 50 in the closed state.

As can be seen from FIG. 3, the sheet metal part 22 has a recess, i.e. is deep drawn, in the region of the valve disk, i.e. in the valve seat, so that the valve disk only insignificantly projects over the upper side of the sorption pump in the closed state. The valve disk can consist of plastic, for example, or can have a plastic cover 51 of e.g. 2 mm thickness and has a centering pin 52 at the center that ensures that the valve disk 50 is correctly inserted. Reference numeral 24 marks a seal in the region of the valve seat that can e.g. have a height of 1 mm.

Reference numeral 30 marks an iron core that is actuated by the electromagnet of the sorption pump 100.

The overhang of the valve cover over the upper side of the vacuum insulation body is marked by L and amounts to 1.5 mm, for example.

The regions that are of particular importance with respect to crease formation during sealing are circled.

Finally, FIG. 4 shows the valve disk 50 in the open state with the suction cup 100 and the upper region of the vacuum insulation body.

Parts that are the same or have the same function are provided with the same reference numerals in all Figures.

The invention claimed is:

1. A vacuum insulation body comprising at least one vacuum-tight covering that surrounds at least one evacuated region, wherein one or more core materials are arranged in the evacuated region,
characterized in that
the vacuum-tight covering has at least one evacuation opening that is provided with at least one valve having a valve disk that opens the evacuation opening in the opened state and that releases the evacuation opening in the closed state, with means for a vacuum-tight sealing of the evacuation opening being arranged outside the sealing region of the valve disk.

2. The vacuum insulation body in accordance with claim 1, characterized in that the means for the vacuum-tight sealing are formed by one or more plastic layers; and/or in that the vacuum-tight sealing is configured such that the gas introduction rate through the evacuation opening is in the range $\leq 10^{-8}$–$10^{-6}$ mbar*l/s in the state with a vacuum-tight seal.

3. The vacuum insulation body in accordance with claim 2, characterized in that the plastic is a polyolefin.

4. The vacuum insulation body in accordance with claim 1, characterized in that the valve disk cooperates in the closed state of the valve with a valve seat whose sealing material has a Shore hardness ≤80 Shore.

5. The vacuum insulation body in accordance with claim 1, characterized in that the valve disk has at least one magnetic material that is arranged such that it can cooperate with at least one external magnet.

6. The vacuum insulation body in accordance with claim 1, characterized in that the valve disk and/or the valve seat that cooperates with the valve disk with a closed valve has/have at least one centering aid.

7. The vacuum insulation body in accordance with claim 1, characterized in that the valve disk and/or the valve seat that cooperates with the valve disk with a closed valve is/are totally or partially elastic.

8. The vacuum insulation body of claim 7, wherein the valve disk and/or the valve seat has/have at least one flat seal, that seals the valve.

9. The vacuum insulation body in accordance with claim 1, characterized in that the valve seals without a vacuum-tight sealing in the closed state such that the gas introduction rate through the valve is in the range $\leq 10^{-5}$–$10^{-3}$ mbar*l/s.

10. The vacuum insulation body in accordance with claim 1, characterized in that the means for the vacuum-tight sealing are formed in part or in full by one or more high barrier films.

11. The vacuum insulation body in accordance with claim 1, characterized in that the vacuum insulation body has at least one stable area element that forms the valve seat of the valve disk, on the one hand, and that serves as a support for the step of the vacuum-tight sealing, on the other hand.

12. The vacuum insulation body in accordance with claim 11, characterized in that the area element is configured such that the valve terminates flush with the sections surrounding the valve and forms a planar surface overall in the closed state.

13. An arrangement comprising at least one vacuum insulation body in accordance with claim 1 and at least one suction cup that is placed onto the evacuation opening of the vacuum insulation body, wherein the suction cup lies sealingly on the vacuum insulation body in the region around the evacuation opening, and wherein the suction cup has at least one region in a vacuum in which at least one lifting element is arranged to open the valve such that the interior of the vacuum insulation body can be evacuated, with the lifting element or another element being suitable to close the valve again after the evacuation process has taken place.

14. The arrangement of claim 13, wherein the lifting element is designed as an electromagnet.

15. A method of evacuating one or more vacuum insulation bodies in accordance with claim 1, characterized in that at least one suction cup is placed onto the vacuum insulation body for the purpose of evacuating the vacuum insulation body, the suction cup sealing the region around the valve disk and having at least one lifting element, and with the valve disk being raised for the purpose of evacuation and with the evacuation opening thus being opened, and with the valve disk again being lowered onto the evacuation opening after the evacuation.

16. The method in accordance with claim 15, characterized in that the valve disk is moved by at least one electromagnet of the suction cup.

17. The method in accordance with claim 15, characterized in that the evacuation process of the vacuum insulation body runs sequentially at one or more suction cups; and in that the evacuation opening of the vacuum insulation body is closed by the valve disk on the transfer of the vacuum insulation body between the evacuation stations or between two evacuation processes.

18. The method in accordance with claim 15, characterized in that the vacuum-tight sealing takes place after the last evacuation process, with the vacuum-tight sealing.

19. A thermally insulated container, having at least one temperature-controlled inner space and having at least one wall at least regionally surrounding the temperature-controlled, inner space, wherein at least one vacuum insulation body in accordance with claim 1 is located between the temperature-controlled inner space and the wall.

20. The thermally insulated container in accordance with claim 19, characterized in that no further thermal insulation is present between the inner space and the wall except for the vacuum insulation body.

* * * * *